United States Patent [19]

Cohen

[11] Patent Number: 4,573,588
[45] Date of Patent: Mar. 4, 1986

[54] VIDEO SHELVING

[76] Inventor: Michael A. Cohen, 122 Canborough Cres., Pickering, Ontario, Canada

[21] Appl. No.: 498,505

[22] Filed: May 26, 1983

[51] Int. Cl.⁴ ............................................... A47F 5/08
[52] U.S. Cl. ........................................ 211/41; 211/40; 211/90; 312/10
[58] Field of Search ................... 211/40, 41, 13, 87, 211/71, 45, 50, 90, 42, 194, 188; D6/185; 206/387; 312/9, 10, 11; 108/60

[56] References Cited

U.S. PATENT DOCUMENTS

| D. 231,063 | 4/1974 | Rafaat | 211/40 X |
|---|---|---|---|
| D. 234,066 | 1/1975 | Wallace | 206/387 X |
| 3,138,261 | 6/1964 | Witteborg | 211/41 |
| 3,737,046 | 6/1973 | Jeter | 312/10 X |
| 4,040,518 | 8/1977 | Carter | 211/41 X |
| 4,117,931 | 10/1978 | Berkman | 211/40 X |
| 4,231,473 | 11/1980 | Aprahamian | 211/40 X |
| 4,257,524 | 3/1981 | Yonkers et al. | 312/15 X |
| 4,312,548 | 1/1982 | Posso | 312/9 |
| 4,317,603 | 3/1982 | Pepicelli et al. | 312/9 |
| 4,396,126 | 8/1983 | Swan | 211/40 |

FOREIGN PATENT DOCUMENTS

| 0028283 | 5/1981 | European Pat. Off. | 211/41 |
|---|---|---|---|
| 2518387 | 6/1983 | France | 312/9 |
| 1503568 | 3/1978 | United Kingdom | 312/9 |
| 2031381 | 4/1980 | United Kingdom | 206/387 |
| 1584157 | 2/1981 | United Kingdom | 211/40 |

Primary Examiner—Robert W. Gibson, Jr.
Attorney, Agent, or Firm—Donald E. Hewson

[57] ABSTRACT

Racks and shelves for displaying such objects as video cassette boxes have been arranged so that the boxes have been presented face-on, or spine-on. The invention displays the boxes diagonally so both the spine and a portion of the front face are presented. The disclosed rack is of vacuum formed plastic sheet material having ribs formed diagonally across a platform. The ribs are hollow, being constituted by folds in the sheet material. Dividers are located in the hollow interiors of the ribs. The boxes are lightly gripped between either the ribs or the dividers. Besides video cassette boxes, the rack is applicable to books when they are of standard thickness, and to other objects.

15 Claims, 4 Drawing Figures

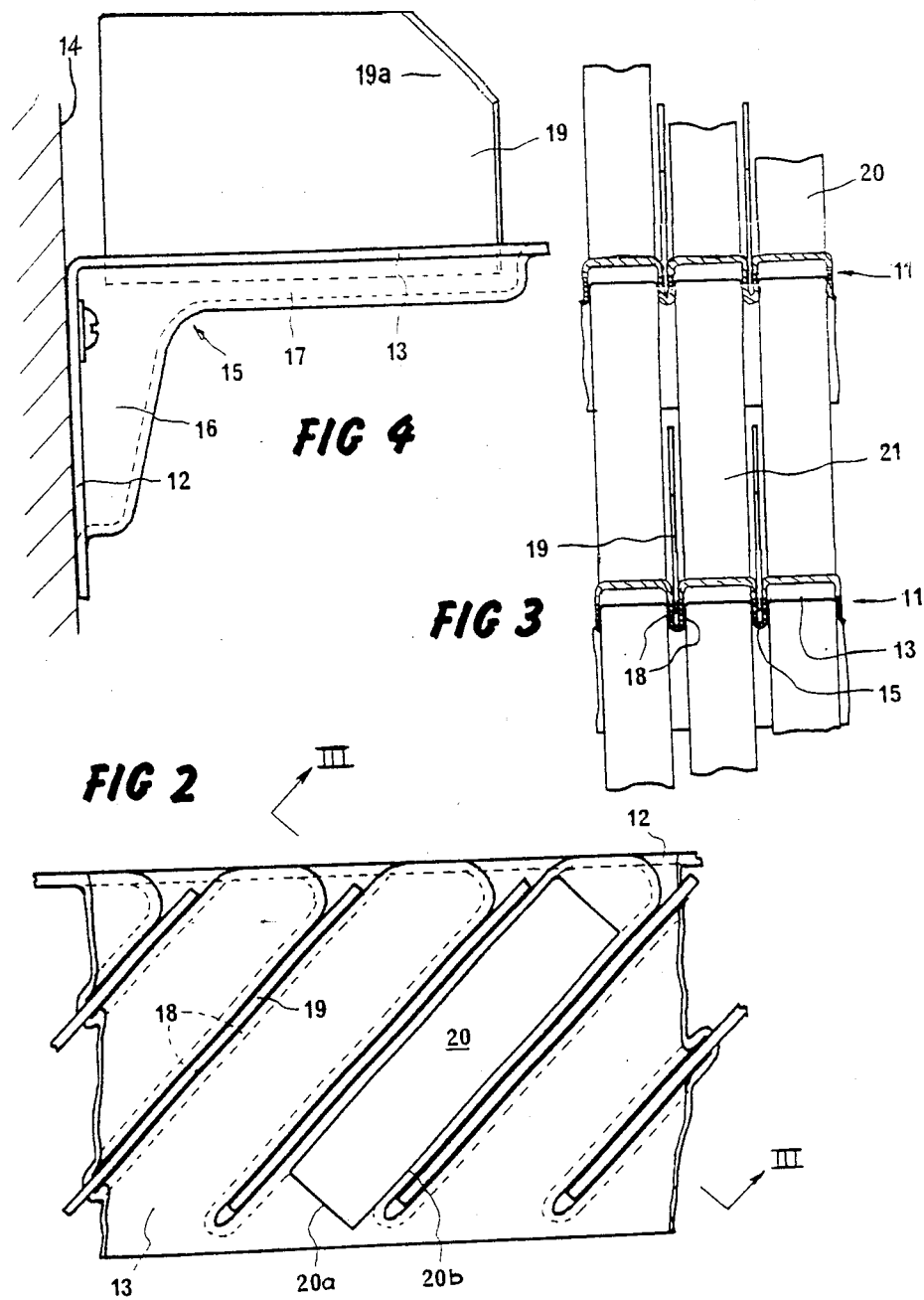

VIDEO SHELVING

This invention is in the field of racks or shelves for storing articles for display, the articles particularly being video cassettes.

BACKGROUND TO THE INVENTION

A video cassette is normally contained in a box which is typically, for example about 160 mm high, 100 mm wide, and 25 mm thick. It is known to provide storage shelves or racks such that the whole of the front face of the box is presented flat-on for inspection by the customer. The two main drawbacks with this system are first that it takes up a great deal of space, and second that it is hard to hold the boxes to the shelf, so that they can easily fall off, or at least become untidy. It is known alternatively to store the boxes edge on; i.e., with only the spine exposed. Now, the space is used very economically, and each box is held in place to some degree by the adjacent boxes. But this second system is unsatisfactory in that the display on the front of the box is, of course, completely obscured. The invention is concerned with achieving the economy of wall space, and the locating of the boxes, yet at the same time with achieving an adequate presentation of the whole display effect of the box; not just the front face, nor just the spine.

BRIEF DESCRIPTION OF THE INVENTION

The invention is aimed at achieving these objects by the provision of spacers placed diagonally across the shelf or platform of the rack. Because the boxes are all the same shape and size, the spacers can be arranged to lightly grip the sides of all the boxes, and thus locate them on the shelf. Even without such a light grip, the boxes are well located on the platform by the spacers. The angle of the diagonal spacers is such that a substantial proportion of the front face of the box is exposed for display, and the whole of the spine is exposed for display. A customer standing in front of the rack can easily see what is presented on the exposed areas; if he decides to take down a box for further inspection, the remaining boxes do not topple together, since they are held each by their own spacers. The customer can easily replace the box from where he took it, and even after a period of inspection by customers the boxes are still neatly and tidily presented for display, with little danger of their having fallen from the shelf, nor of the corners having become scuffed and unsightly.

PRIOR ART

U.S. Pat. No. 3,737,046 (JETER, June 5, 1973) shows a shelf unit having partitions arranged diagonally, for filing papers. Papers, and files of paper, are thus disposed at an angle so that one can see a narrow strip contiguous with the edge of the face of the file, and it is arranged that the identifier of the file is placed on that strip. The present invention is distinguished from JETER in that in JETER the papers, or files of papers, are not each much thicker than the thickness of the spacer: in fact, a number of files are to be placed between each pair of spacers. Only with objects the thickness of a video cassette box does it become practical to have each box located individually by the spacers. JETER does not contemplate the simultaneous display and presentation of a portion of the front face and the spine of the article.

U.S. Pat. No. 3,138,261 (WITTEBORG, June 23, 1964) does show diagonal spacers defining compartments, one for each article (in this case, samples of carpeting). However, when displaying carpeting, as when displaying files of papers, there is no reason to have the "spines" on display as well as the front faces; this aspect is reflected in WITTEBORG where the angle of the dividers is very small so that the spine is, in substance, not at all on display.

Attempts have been made to keep video cassette boxes neatly on display shelves, as shown in U.S. Pat. No. 4,235,490 (SCHWARTZ, Nov. 25, 1980) for example. U.S. Pat. No. 3,977,523 (COUSINO, Aug. 31, 1976), and U.S. Pat. No. 481,505 (MUIR, Aug. 23, 1892), also show means for keeping articles tidily on shelves. All these, however, teach only the display presentation of the spines of the articles, not their front faces.

The invention is applicable not only to video cassette boxes but to other articles of a generally similar nature. The characteristics that the articles should have for the invention to be most applicable are these: first, the articles should have a thickness themselves of around 20 mm, or more. The practical thickness of a spacer can hardly be less than about 2 mm (if the spacer is to have the degree of robustness, when made of plastic, needed for a display rack); if the articles were less than about 20 mm in thickness, then the spacers would occupy an uneconomical fraction of the available room. Second, the article should have display material on both its front face and its spine: a book would come into this category, and so would a gramophone record. The latter, of course, is not applicable for the reason that it is much too thin: only a negligible portion of the front face of a record sleeve would be on display, if the sleeves were to be stored diagonally. The invention is, however, applicable to books, when the books have the third characteristic, which is that the articles should be standard sized. The dimension in question is the thickness, particularly, and not all books have the same thickness: when a set of books to be displayed together do, however, have the same thickness, then the invention is applicable.

The invention is admirably suited to the display of video cassette boxes. Audio cassette boxes while being standard-sized are substantially thinner, and are therefore not such an attractive proposition for display according to the invention, though audio cassette boxes would not be ruled out completely on the grounds of thinness as would gramophone records.

Further aspects of the invention will become apparent from the description, with reference to the drawings, of an exemplary embodiment of the invention, which follows.

IN THE DRAWINGS

FIG. 2 is a plan view of the rack of FIG. 1.

FIG. 3 is a view, partly sectioned, on line III—III of FIG. 2.

FIG. 4 is a side elevation of the rack of FIG. 1.

DETAILED DESCRIPTION OF A PREFERRED EMBODIMENT

Figure 1:
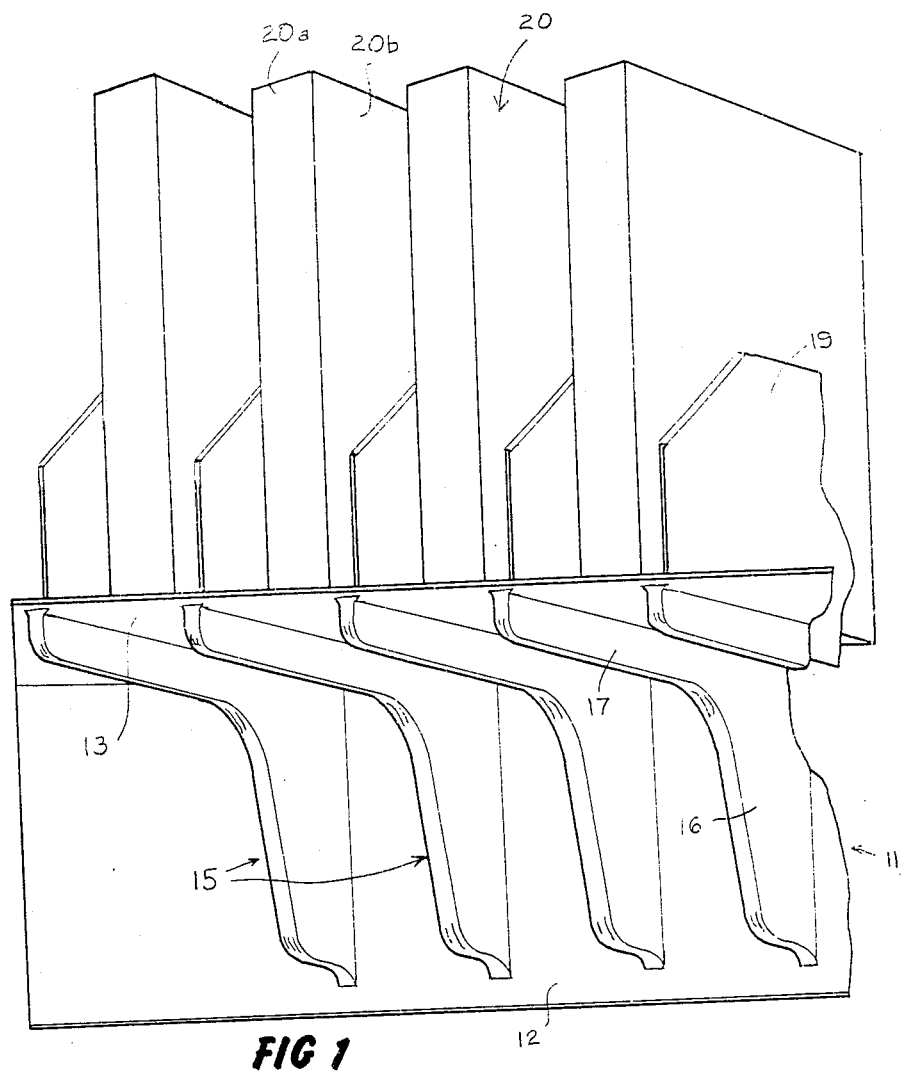
FIG. 1 is a front view of a rack for storing video cassettes.

The rack 11 shown in the figures comprises a back wall portion 12 and a platform portion 13. The back wall portion 12 is arranged to be fixed to a vertical wall 14, the platform portion 13 then being disposed horizontally.

The rack 11 is provided with ribs 15. Each rib 15 has a back portion 16 which depends from the back wall 12, and a top portion 17 which depends from the platform 13. The back portion 16 of the rib 15 is tapered (in the manner common to ribs in many different applications) becoming progressively narrower the further down from the junction between the back wall 12 and the platform 13. The top portion 17 of the rib 15, however, is substantially not tapered, but has a constant depth throughout its length.

The rib 15 is formed as a fold in the material of the rack 11. The material is plastic sheet, of a suitable consistency, which is vacuum formed over or into a mold, using conventional vacuum forming procedures. Forming the ribs 15 in this manner is effective to produce a hollow rib, having two side walls 18 which define a slot between them.

It is arranged that the slot thus formed is so dimensioned as to grip a divider 19 placed in the slot, i.e., between the side walls 18. The divider 19 may be of transparent plastic, of simple rectangular shape, but having a chamfer 19a at one corner.

The ribs 15 are disposed at an angle to the back wall portion 12 in the plan view, of about 38 degrees. Cassette boxes 20, when placed on the rack between the dividers 19, therefore have their spines 20a, and a part of their fronts 20b, on display and readily visible from in front of the rack. The boxes 20 are spaced slightly apart by the ribs 15, so the boxes can easily be taken down for inspection, and furthermore the boxes can be put back neatly and safely. If the boxes 20 supported one another, taking one box out could cause the rest to topple. Also, in that case it would be possible to insert the box back into the wrong place after inspection. These problems are minimised by having each cassette box 20 individually supported, and each box having its own assigned space, in the manner described. Furthermore, the storekeeper can easily keep his display of boxes neat and tidy, and he can readily see when stocks need to be replenished.

As to the magnitude of the angle at which the ribs are disposed, the important aspects are these: if the angle is too large (i.e. if the spines are presented almost full-on to a person standing in front of the rack, then the character of the rack is lost in that too little of the front of the box 20 is on display; if the angle is too small (i.e., if the boxes 20 lie almost flat against the wall) then again the character of the rack is lost in that the available wall space is used inefficiently. Between these two extremes, however, lies a range of acceptable angles: if the angle is less than 30 degrees, then the spine is not well presented, and the use of wall space becomes somewhat inefficient; if the angle is more than about 50 degrees, then too little of the front face is exposed, and even that which is exposed cannot be easily seen from in front.

In FIG. 1, the boxes 20 simply rest in the spaces between the dividers 19. In FIG. 3, however, it will be seen that the boxes 21, in addition to resting between the dividers 19 in the platform 13 on which they are supported, are also positioned between the ribs 15 that depend from the platform 13 of the rack 11 above. The racks 11 are positioned vertically on the wall 14 so as to achieve this condition. The spacing of the ribs 15 is arranged to be such that a box 21 is lightly squeezed when inserted between ribs 15 in this manner. The racks 11 therefore grip each box 21 slightly, which is very useful in keeping the arrangement of boxes on display visually attractive, even in view of a certain amount of rough use as can happen in a retail shop.

The thickness of the plastic sheet from which the rack 11 is made is about 2 mm. If the thickness were less than this, the rack 11 would be too flimsy, even with the ribs, to be used in a shop. If the material were thicker, that would be wasteful, and also it would make the ribs harder to form by vacuum moulding. In fact, if the material were thicker than 2 mm, it would become difficult to form the ribs so as to produce a slot of constant, controlled width inside the rib.

It will be appreciated that the gap between cassette boxes is two material thicknesses, plus the thickness of the divider. With the material thickness at 2 mm, this gap is just about ideal as regards spacing the boxes 21 for easy visibility, and access for withdrawal and replacement, and as regards on the other hand an efficient use of the available wall space. This is because the cassette boxes themselves have a thickness of about 25 mm: if the boxes were thinner, the compromise between spacing and efficiency would not be so admirable. To achieve the same proportional compromise with audio-cassette boxes for example, the material would have to be about 1 mm thick, and that would render the rack somewhat too flimsy. Similarly, records, being about 3 mm thick, are quite unsuited to be stored in racks with the ribs as described, at least if efficiency of use of wall space is a consideration.

Books, however, can be very well stored in the racks, provided they are roughly of the thickness of a video cassette box, and provided the books to be displayed were all of a standard size. Naturally, to display those books the racks would be made to suit that standard size.

There is more than one standard size of video cassette box or video game cartridge box (and, of course, more than one standard size of book). So long as the thickness is in the region of 25 mm, then the rack as described is admirably suited for display storage: as many standard thicknesses of object as there are in that region, or thicker, so many sizes of rack would be provided. The ribs have been shown and described as equi-spaced, but it could even be arranged that the rib-spacing were varied slightly along the rack, so that different standard sizes could be accommodated in the slightly different spaces.

This may be especially so when the display includes a mix of video vassette boxes of different size formats, or when the mix includes video game cartridges.

What is claimed is:

1. A display rack, comprising:
a vertical back wall portion;
a horizontal platform portion; and ribs;
where the ribs are arranged to stiffen and reinforce the said two portions and the junction between them;
where the back wall portion, the platform portion, the junction between them, and the ribs, are all formed integrally in and from one unitary piece of material;
where the ribs each have two respective side walls, arranged so as to create a hollow slot between the two side walls;
where the said side walls lie each in a respective substantially vertical plane;

where each of the said planes lies at an angle to the plane of the back wall portion of between 30 degrees and 45 degrees;

and where each of the said slots is provided with a respective divider which is dimensioned to fit tightly between, and be gripped by, the said side walls of the slot.

2. Rack of claim 1, where the unitary piece of material is a piece of sheet material, which is formed to shape by the process of by vacuum-forming the material over a mould.

3. Rack of claim 1, where the platform portion is flat and level, where the ribs protrude below the horizontal level of the platform portion, and where the dividers in the slots protrude above the level of the platform portion.

4. Rack of claim 1, where the dividers are respective flat sheets of transparent material.

5. Rack of claim 24 where the said angle is 38 degrees.

6. A display rack, in combination with a series of articles to be displayed;

where the articles each have a respective front face and a respective spine;

where the rack comprises a vertical back wall portion, a horizontal platform portion, and a series of spacers;

where the articles rest in the spaces between the spacers, one to each space;

where each of the spacers itself has a thickness that is much less than the thickness of one of the articles;

where the spacers are vertical, and are arranged each at an angle with respect to the back wall portion, and diagonally with respect to the platform portion;

where the said angle of the spacers has such a value that a first one of the articles resting on the platform portion in the space between spacers partially overlaps a second one of the articles resting in the next space alongside, and that the said first article then obscures a portion of the front face of the said second article, but leaves a substantial portion of that front face exposed;

where the said angle of the spacers has such a value that both the spine and the exposed portion of the front face of each of the articles are visible simultaneously from in front of the rack, and are thereby both presented prominently on display together;

where the spacers are arranged so that they themselves substantially do not obscure either the spine or the exposed portion of the front face of the articles;

where the rack is provided with ribs, and where the ribs are arranged to stiffen and reinforce the said two portions and the junction between them;

where the back wall portion, the platform portion, the junction between them, and the ribs, are all formed integrally in and from one unitary piece of sheet material;

where the ribs each have two respective side walls, and are constituted by respective folds in the sheet material;

where the folds are so formed as to create a hollow slot between the two side walls;

and where each of the said slots is provided with a respective divider which is dimensioned to fit tightly between, and be gripped by, the side walls of the slot.

7. Combination of claim 6, where the space between the opposing side walls of adjacent ribs is substantially equal to the thickness of one of the articles.

8. Combination of claim 7, where the space between adjacent dividers is substantially equal to the thickness of one of the articles.

9. Combination of claim 7, where the dividers are respective flat sheets of transparent material.

10. Combination of claim 7, where the sheet material has a nominal thickness of about 2 mm.

11. Combination of claim 7 where the articles have a thickness each of about 20 mm.

12. Combination of claim 6 where the articles are video cassette boxes.

13. Combination of claim 6 where the said angle is between 30 and 45 degrees.

14. Combination of claim 13, where the said angle is 38 degrees.

15. The combination of claim 6, where the articles are substantially a snug fit in the spaces.

* * * * *